United States Patent [19]

Just et al.

[11] 4,339,244

[45] Jul. 13, 1982

[54] PROCESS FOR THE REDUCTION OF THE PARTICLE SIZE OF COARSE GRAIN ZEOLITIC SODIUM ALUMINOSILICATES

[75] Inventors: Günther Just, Hilden; Franz-Josef Carduck, Haan, both of Fed. Rep. of Germany

[73] Assignee: Henkel Kommanditgesellschaft auf Aktien (Henkel KGaA), Dusseldorf-Holthausen, Fed. Rep. of Germany

[21] Appl. No.: 264,291

[22] Filed: May 18, 1981

[30] Foreign Application Priority Data

Jun. 6, 1980 [DE] Fed. Rep. of Germany ....... 3021370

[51] Int. Cl.$^3$ ............................................ B02C 19/16
[52] U.S. Cl. ..................................... 23/293 A; 241/21
[58] Field of Search ............ 23/293 A; 209/268, 269; 423/328; 241/21

[56] References Cited

U.S. PATENT DOCUMENTS

| | | | |
|---|---|---|---|
| 2,298,182 | 10/1942 | Strube | 209/269 |
| 3,582,379 | 6/1971 | Hackbarth et al. | 423/328 |
| 3,853,535 | 12/1974 | Mogyorosi et al. | 241/21 |
| 4,150,100 | 4/1979 | Kettinger et al. | 423/328 |
| 4,173,622 | 11/1979 | Robertson | 423/328 |

*Primary Examiner*—Hiram Bernstein
*Attorney, Agent, or Firm*—Hammond & Littell, Weissenberger and Muserlian

[57] ABSTRACT

A process for the reduction of the particle size of coarse grain, crystalline zeolitic sodium aluminosilicate of the NaA type obtained in an aqueous alkaline suspension by crystallization of a reaction mixture suspension formed from sodium aluminate solution and sodium silicate solution, said sodium aluminosilicate having a large cation exchange capacity consisting essentially of subjecting said aqueous alkaline suspension of the crystallized sodium aluminosilicate to treatment on a vibrating screen having a substantially uniform mesh size between 25 to 100 μm, the number of vibrations per minute and the amplitude of oscillation of said screen being so selected that at least 99.95 percent by weight, based on the anhydrous weight, of sodium aluminosilicate particles recovered have a particle size of less than 100 μm, the said aqueous alkaline suspension of the crystallized sodium aluminosilicate having a molar ratio of 2.5-5 Na$_2$O:1 Al$_2$O$_3$:1.8 to 2 SiO$_2$:50-100 H$_2$O.

7 Claims, No Drawings

PROCESS FOR THE REDUCTION OF THE PARTICLE SIZE OF COARSE GRAIN ZEOLITIC SODIUM ALUMINOSILICATES

BACKGROUND OF THE INVENTION

The subject of the invention is a process for the reduction of the particle sizes of coarse grain, crystalline, zeolitic sodium aluminosilicates of the NaA type, which are obtained in an aqueous alkaline suspension by the crystallization of a suspension reaction mixture formed from sodium aluminate and sodium silicate solutions.

The so-called zeolites form a mineral class of alkali metal aluminosilicates that contain water of crystallization and have a defined structure of pores and hollow spaces in their aluminosilicate lattice. Synthetic zeolites have gained increasingly technological significance and are used, for example, as cation exchange agents mainly for the softening of water, as catalyst carriers for chemical processes, as drying, parting or sorption agents for solvents and gases ("molecular sieves"), as well as heterogeneous inorganic builders in washing and cleaning agents. Depending on the intended purpose, structurally differing zeolite types and also different degrees of dryness and purity are needed. Such zeolites generally are first prepared in their sodium form and, if desired, subsequently converted into other forms by cation exchange.

With respect to the intended purposes mentioned above, especially the zeolitic sodium aluminosilicate of the NaA type has become technically important. The chemical composition of this type of zeolite approximately corresponds to the empirical formula:

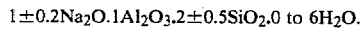

$1 \pm 0.2 Na_2O.1Al_2O_3.2 \pm 0.5SiO_2.0$ to $6H_2O$.

The characteristic x-ray diffraction diagram of the zeolite NaA is described, for example, in U.S. Pat. No. 2,882,243.

A very finely powdered zeolite with as narrow a particle size distribution as possible and an average particle size of less than 10 μm is generally preferred for most technical applications. Furthermore, especially when the zeolite NaA is used in washing and cleaning agents, its content of particles with a particle size above 50 μm—called "grit" in the following text—should not amount to more than 0.2 percent by weight, or preferably be below this limit, and its cation exchange capacity should be relatively high.

Zeolitic sodium aluminosilicates generally are prepared by discontinuous or also continuous mixing of an aqueous sodium aluminate solution with an aqueous sodium silicate solution in the presence of excess sodium hydroxide solution at an elevated temperature. The x-ray-amorphous sodium aluminosilicates formed in a primary reaction usually are converted into the respective crystalline zeolite forms by subsequent heating of the reaction mixture suspension for a certain length of time. The formation of crystalline products requires a period of time from a few minutes to several days, depending on the molar rations of the reaction partners in the starting batch and the regulation of the temperature. This crystallization process is carried out mainly under atmospheric pressure and at temperatures in the range from 70° to 100° C. for the preparation of the zeolite NaA. This procedure, together with a respective composition of the reaction mixture, generally results in highly crystalline zeolites of the type NaA with a great cation exchange capacity, which are first obtained in the form of an aqueous alkaline suspension.

Because of the desired small particle sizes of the formed zeolite NaA, until now it has been attempted to keep the proportion of grit as low as possible by the choice of certain suitable reaction parameters for the zeolite synthesis, such as temperature, period of mixing of the reaction partners, composition of the reaction mixture and other such measures. A particular proposal made in this connection was to allow strong shear forces to act on the reaction mixture during the mixing of the reaction partners and, if desired, also during the crystallization step, to counteract the formation of coarse-grained products in this manner.

To reduce the particle size, zeolite crystals, which were isolated from the mother liquor and dried, were also milled in a ball mill and the obtained fractions were separated in a centrifugal sifter. Most of the described steps involve considerable technical work, however, and may also in addition result in a lower space-time yield of the entire process because of the special, and thus in some respects restricted, procedural course. Despite optimal process conditions, the obtained grit contents usually are within the range from 0.05 to 0.3 percent by weight, based on the total yield of zeolite NaA.

OBJECTS OF THE INVENTION

An object of the present invention is the development of a process for obtaining zeolitic sodium aluminosilicates of the smallest particle size, which, on the one hand, with respect to the reaction parameters, allows an unrestricted procedural course with a high space-time yield as well as, on the other hand, results, due to a subsequent reduction of the particle size of the formed coarse zeolite component, in a zeolite NaA with as little grit as possible and a high cation exchange capacity, whose coarse particle contents amount to less than 0.05 percent by weight. This object concerns especially the preparation of a zeolite NaA with a grit content, that is, particles with a particle size above 50 μm, of less than 0.05 percent by weight.

Another object of the present invention is the development of a process for the reduction of the particle size of coarse grain, crystalline zeolitic sodium aluminosilicate of the NaA type obtained in an aqueous alkaline suspension by crystallization of a reaction mixture suspension formed from sodium aluminate solution and sodium silicate solution, said sodium aluminosilicate having a large cation exchange capacity consisting essentially of subjecting said aqueous alkaline suspension of the crystallized sodium aluminosilicate to treatment on a vibrating screen having a substantially uniform mesh size between 25 to 100 μm, the number of vibrations per minute and the amplitude of oscillation of said screen being so selected that at least 99.95 percent by weight, based on the anhydrous weight, of sodium aluminosilicate particles recovered have a particle size of less than 100 μm, the said aqueous alkaline suspension of the crystallized sodium aluminosilicate having a molar ratio of $2.5-5Na_2O:Al_2O_3:1.8$ to $2SiO_2:50-100H_2O$.

These and other objects of the present invention will become more apparent as the description thereof proceeds.

DESCRIPTION OF THE INVENTION

The subject of the invention consequently is a process for the reduction of the particle size of coarse-grained crystalline zeolitic sodium aluminosilicates of the NaA type that are obtained in the form of an aqueous alkaline suspension by the crystallization of a reaction mixture suspension formed from sodium aluminate and sodium silicate solutions and are distinguished by a great cation exchange capacity, which is characterized by the fact that the aqueous alkaline suspension of the crystallized sodium aluminosilicate is subjected to treatment on a vibrating screen with a substantially uniform mesh size between 25 to 100 $\mu$m, the driving speed of the motor driving the vibrating screen as well as its oscillation amplitude being selected so that at least 99.95 percent by weight of the sodium aluminosilicate particles passing through the screen have a particle size of less than 100 $\mu$m.

More particularly, the present invention relates to a process for the reduction of the particle size of coarse grain, crystalline zeolitic sodium aluminosilicate of the NaA type obtained in an aqueous alkaline suspension by crystallization of a reaction mixture suspension formed from sodium aluminate solution and sodium silicate solution, said sodium aluminosilicate having a large cation exchange capacity consisting essentially of subjecting said aqueous alkaline suspension of the crystallized sodium aluminosilicate to treatment on a vibrating screen having a substantially uniform mesh size between 25 to 100 $\mu$m, the number of vibrations per minute and the amplitude of oscillation of said screen being so selected that at least 99.95 percent by weight, based on the anhydrous weight, of sodium aluminosilicate particles recovered have a particle size of less than 100 $\mu$m, the said aqueous alkaline suspension of the crystallized sodium aluminosilicate having a molar ratio of 2.5–5$Na_2O$:$Al_2O_3$:1.8 to 2$SiO_2$:50–100$H_2O$.

It was surprising to find that the proportion of coarse-grained zeolite particles formed during the synthesis can be reduced considerably by the subsequent treatment, according to the invention, of the suspension of the crystalline zeolitic sodium aluminosilicate. This involves not merely the separation of this coarse proportion by sifting, but an effective reduction of the partice size, that is, the breaking up of the coarse particles, by more than 50 percent by weight of the screening treatment. The proof of a reduction of the coarse proportion, and thus also of the effect of the process according to the invention, is easily and visibly demonstrable by determining the content of coarse particles or grit in the suspension before and after the screening, using to advantage a modified method for the particle size determination by MOCKER, which will be explained hereafter. The effect obtainable with the aid of the process according to the invention is the more surprising as, until now, special process variations of the synthesis of the crystallization had to be applied to suppress as much as possible the formation of coarse zeolite particles, which is favored by crystal chemistry, on the one hand, and on the other hand, the coarse particles, once formed, were difficult to break up again.

The advantages of the process according to the invention are to be found particularly in the following main points. First, the actual synthesis, that is, the mixing of the reaction partners as well as the crystallization step, can be performed without any reaction parameters that would have a negative influence on the space-time yield of the process. Particularly also the application of strong shear forces during mixing or crystallization can be eliminated since the formation of coarse zeolite particles is acceptable. Second, no technologically involved milling processes necessitating a preceding isolation and drying of the obtained zeolite crystals are required.

Basically, all conventional vibrating screens with a construction that permits a wet/dry separation of the screened material are suitable. For example, the respective equipment of the company RUSSEL FINEX, Zaventem, Belgium can be utilized for this purpose. The vibrating frequency important for the output of such a vibrating screen is determined mainly by the driving speed of the electromotor causing the movement of the screen (number of vibrations per unit time) as well as by the amplitude of the screen vibration. The effect to be produced by this is important for the choice of the variables in connection with the process according to the invention, that is, these variables must be adjusted so that at least 99.95 percent by weight of the zeolite particles passing through the screen have a particle size of less than 100 $\mu$m. Furthermore, these variables preferably should be chosen so that only a minimal residue, if possible, remains on the screen.

This effect can be treated or determined in a technically simple manner with the aid of a modified wet-screening method according to MOCKER by determining the proportion of coarse particles in the suspension passing through the screen. A weighed sample of the formed crystalline material, suspended in water, is transferred to a test screen with a mesh size of 100 $\mu$m (DIN 4188) in a test instrument according to MOCKER (DIN 53 580) and whirled upwards with the aid of water sprayed through rotating jets. The fine portions of the crystalline material are flushed through the testing screen in this manner without using pressure, while the coarse portions remain on the screen. After a period of 2 minutes, and an amount of 80 liters of water sprayed per hour, the testing screen is dried in the drying oven at 110° C. and subsequently the screen residue is determined by weighing the difference. The screen residue is obtained according to the formula:

$$\text{screen residue in percent by weight} = [(a-b) \times 100]/E,$$

with
a = weight of the screen with residue
b = weight of the screen without residue
E = sample weight in gm, based on dry material.

The effect of the screening treatment on the reduction of the particle size of the coarse zeolite particles is easily determined by this method, and the variables affecting the performance of the vibrating screen can be adjusted or corrected accordingly.

Basically the same applies also to the duration of the treatment of the suspension containing the coarse portions on the vibrating screen. This means that the duration of the treatment is determined practically solely by the effect explained above and must be chosen in relation to this effect. In general, it may be stated that a longer period of treatment for the suspension on the vibrating screen will benefit the reduction of the coarse zeolite particles.

The following must be observed with regard to the chosen mesh size of the vibrating screen. The information concerning the mesh size of the screen, such as, 50 $\mu$m, indicates only that the screen openings have an average size of 50 μm. Since these screens are technically cloths, a uniform mesh size cannot be expected and deviations from the given mesh size that result in a passing of particles with a particle size of more than 50 μm must be taken into consideration.

The selection of a screen suitable for the process according to the invention also includes attention to the alkali resistance of the screen cloth since the material to be treated generally is a strongly alkaline suspension.

In keeping with the explanations above, substantially uniform screen mesh sizes in the range from 25 to 100 μm may be used for the process according to the invention, depending on the desired, and within the scope of the overall process, desirable fineness of the zeolite particles to be obtained. However, in view of a reduction of the grit proportion of the formed NaA zeolite—that is, those particles with a particle size of more than 50 μm—the subjecting of the suspension to a treatment on a vibrating screen with a mesh size of 50 μm is especially preferred, for which the driving speed of the vibrating screen and its oscillating amplitude must be chosen so that at least 99.95 percent by weight of the sodium aluminosilicate particles passing through the screen have a particle size of less than 50 μm.

The variables determining the performance of the vibrating screen are established analogous to the explanations above and based on the effect to be obtained, which can be determined and checked—as described—by the modified wet-screening method according to MOCKER, with the aid of a test screen with a mesh size of 50 μm (DIN 4188).

Thus a zeolite NaA with a grit content of not more than 0.05 percent by weight results from this preferred method. This is a significant advantage in the use of the zeolite in washing and cleaning products.

In general, all of the zeolites of the NaA type obtained by the conventional zeolite syntheses can be treated by the process according to the invention with respect to their particle size. In other words, this means that the type and manner of preparation, whether continuous or discontinuous, as well as the adjusting of the reaction parameters, are unimportant for the performance of the process according to the invention as well as for its effect. However, it is known that a considerable dilution of the reaction mixture, that is, a high water content, results by itself in relatively low grit products that do not necessarily require after-treatment in the manner according to the invention. However, such a relatively high water content results at the same time in a lower space-time yield of the process. In contrast to this, a low water content of the reaction mixture does result in improved space-time yields on the one hand, but also in an increased formation of grit, on the other.

With regard to the above, it is therefore preferred within the scope of the process according to the invention that a suspension, which is formed after the completed crystallization of a reaction mixture with a mathematical total composition with respect of the molar ratios of 2.5 to $5Na_2O:1Al_2O_3:1.8$ to $2SiO_2:50$ to $100H_2O$, is subjected to treatment on a vibrating screen. The advantages of the process according to the invention thus are pronounced with regard to an improved space-time yield of the zeolite synthesis particularly with such compositions of the reaction mixture.

Furthermore, it is meaningful and advantageous in the interest of the highest possible space-time yield of the entire zeolite synthesis to follow the completed crystallization process immediately with the process according to the invention and to subject the aqueous alkaline suspension of the freshly crystallized sodium aluminosilicate to treatment on the vibrating screen. However, it was observed that even a certain aging of the suspension and thus of the grit particles contained in it does not impair the effect of the process according to the invention. This is of some significance in view of a possibly necessary interim storage of the freshly crystallized product. As far as this is concerned, the suspension may still be treated in the manner according to the invention during a period of 5 hours, for example, after the completed crystallization. However, according to the process of the invention, the subjecting of the suspension to the treatment on a vibrating screen immediately following crystallization is preferred.

This procedure results, after completed zeolite synthesis and crystallization as well as after the performance of the process according to the invention, in an aqueous alkaline suspension of very finely divided crystalline sodium aluminosilicate zeolites of the NaA type that are distinguished preferably by a grit content of less than 0.05 percent by weight as well as by a great cation exchange capacity.

To characterize the obtained crystallized material, samples of the product are filtered off, washed until free of alkali, dried over night in the vacuum drying oven at 100° C. and identified by the x-ray diffraction diagram. The composition with respect to $Na_2O$, $Al_2O_3$ and $SiO_2$ can be determined by x-ray fluorescence analysis. The water content can be calculated from the weight loss of a crystal sample due to ashing for one hour at 800° C. The particle size distribution, as distribution of the crystal particles in percent by volume, may be measured with a Coulter-Counter ®, such as model TA, if desired. The determination of the grit content in the crystals is carried out by the modified wet-screening according to MOCKER, as described above.

The calcium-binding capacity of 1 gram of zeolite NaA in one liter of water with an initial degree of hardness of 30° dH (German hardness) is used as the measure of the cation exchange capcity of the crystalline zeolite. One liter of an aqueous solution containing 0.594 gm of $CaCl_2$ (corresponding to 300 mg CaO/liter - 30° dH) is adjusted to pH 10 with dilute sodium hydroxide solution and mixed with 1 gm of zeolite NaA on an anhydrous basis. The formed suspension is then vigorously agitated for a period of 15 minutes at a temperature of 22°±2° C. After filtering off the zeolite, the residual hardness X in the filtrate is determined by complexometric titration with ethylenediaminetetraacetic acid. The calcium-binding capacity in mg CaO/gm of anhydrous zeolite is calculated from this according to the formual:

$$(30-X).10.$$

The suspension of crystalline, zeolitic, finely divided and low-grit sodium aluminosilicates of the NaA type obtained according to the invention is usually worked up further. For this purpose, the crystalline solids, for example, are filtered off, washed and dried or, depending on the intended use, finished in some other conventional manner. If desired, an aqueous, alkaline-free suspension of the crystalline sodium aluminosilicate also may find application in the preparation of washing and cleaning products. Mother liquor and wash water are returned to advantage into the production process.

Because of the low grit content of less than 0.05 percent by weight as well as the great cation exchange capacity expressed in a calcium-binding capacity in the range from 150 to 200 mg CaO/gm of zeolite, the obtained sodium aluminosilicate zeolite is used preferably as heterogeneous inorganic building (phosphate substitute) in washing, rinsing and cleaning products.

The performance of the process according to the invention is explained in more detail in the following examples, which are not to be deemed limitative.

EXAMPLE 1

275 kg of sodium silicate solution and 568 kg of sodium hydroxide solution were placed in a reaction vessel equipped with an agitator and quickly reacted with 658 kg of sodium aluminate solution at a temperature of 70° C. with stirring. The composition of the individual reaction components was chosen in such a manner that the composition of the reaction mixture corresponds to molar ratios of:

$$4Na_2O:1Al_2O_3:1.8SiO_2:75H_2O.$$

The reaction mixture was then heated to 80° C. with stirring, and the primarily formed amorphous product was converted into a crystalline sodium aluminosilicate at this temperature within 30 minutes.

A worked-up sample of the obtained crystalline reaction product was found to be a highly crystalline zeolite of the NaA type according to x-ray diffraction analysis and had a calcium-binding capacity of 168 mg CaO/gm of zeolite as well as a grit content of 1.19 percent by weight.

The entire suspension of the crystalline product was then transferred to a high-performance vibrating screen, RUSSEL FINEX Company—type Air Finex 22 MK II, which was equipped with a V4A-steel screen with a mesh size of 50 μm. The vibrating screen was operated at a driving speed of 2,800 rpm or vibrations per minute and an oscillating amplitude of 6 mm.

After the completed screening, a screening residue of 1.3 kg, based on anhydrous material, was obtained. The suspension passing through the screen had a grit content of 0.02 percent by weight. This corresponds to a grit reduction of 52 percent, based on the total amount of grit contained in the suspension before screening, that had taken place during the screening process, as is shown in the following tabulation:
 1. Batch, amount: 1,501 kg
 2. Zeolite yield (anhydrous): 226 kg (15% wt of 1.)
 3. Grit content before screening (anhydrous): 2.7 kg (1.19 wt of 2.)
 4. Grit content after screening (screening residue, anhydrous): 1.3 kg (48% wt of 3.)
 5. Grit reduction to a particle size below 50 μm. 1.4 kg (52% wt of 3.)

This example clearly demonstrates the effect of the process according to the invention with respect to the reduction of the particle size of the zeolite, expressed, on the one hand, in the low residual grit content of the suspension of 0.02 percent by weight, and, on the other hand, in the achieved grit reduction of over 50 percent.

EXAMPLE 2

A vertically arranged agitator column (effective volume 188 liters) subdivided into a total of 28 chambers by separating plates and equipped with the same number of MIG-agitators was used for the zeolite synthesis in this example. This agitator column permits continuous mixing. The reaction components, which are preheated to a reaction temperature of 60° C., were fed synchronously into the lower chambers of the agitator column with the aid of suitable metering devices. The transporting of the reaction mixture from chamber to chamber is effected by circular slits arranged in a staggered pattern in the separating plates, which results in a continuously rising stream of product within the column. The dosing of the reaction components amounted to 400 kg of sodium silicate solution per hour, 600 kg of dilute sodium hydroxide solution per hour and 873 kg of sodium aluminate solution per hour. The composition of the individual reaction components was chosen so that the composition of the reaction mixture corresponds to molar ratios of:

$$3.6Na_2O:1Al_2O_3:1.8SiO_2:80H_2O.$$

The reaction mixture recovered from the tower was then heated to 90° C., and the primarily formed amorphous product was continuously converted into a crystalline sodium aluminosilicate at this temperature, within 30 minutes.

A worked-up sample of the obtained crystalline reaction product was determined to be a highly crystalline zeolite of the NaA type according to the x-ray diffraction analysis, which had a calcium-binding capacity of 176 mg CaO/gm of zeolite and a grit content of 0.7 percent by weight.

The entire suspension of the crystalline product was then transferred to a high-performance vibrating screen of the RUSSEL FINEX COMPANY—type 22 HD—which was equipped with a V4A-steel screen with a mesh size of 50 μm. The vibrating screen was operated at a driving speed of 2,800 rpm or vibrations per minute and an oscillation amplitude of 6 mm.

A screening residue of 0.8 kg/hour, based on anhydrous material, was obtained during this process. The suspension passing through the screen had a grit content of 0.01 percent by weight. This corresponds to a grit reduction of 58 percent, based on the total amount of grit in the suspension before screening, which had taken place during the screening process, as is shown in the following tabulation:
 1. Batch amount: 1,873 kg/hr
 2. Zeolite yield (anhydrous): 271.4 kg/hr (14.5 wt. % of 1.)
 3. Grit content before screening (anhydrous): 1.9 kg/hr (0.7 wt. % of 2.)
 4. Grit content after screening (screening residue, anhydrous): 0.8 kg/hr (42 wt. % of 3.)
 5. Grit reduction to a particle size below 50 μm: 1.1 kg/hr (58 wt. % of 3.)

This example also shows the effect of the process according to the invention with regard to the reduction of the particle size of the coarse zeolite portions.

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. A process for the reduction of the particle size of coarse grain, crystalline zeolitic sodium aluminosilicate of the NaA type obtained in an aqueous alkaline suspension by crystallization of a reaction mixture suspension formed from sodium aluminate solution and sodium silicate solution, said sodium aluminosilicate having a large cation exchange capacity consisting essentially of subjecting said aqueous alkaline suspension of the crystallized sodium aluminosilicate to treatment on a vibrating screen having a substantially uniform mesh size between 25 to 100 μm, the number of vibrations per minute and the amplitude of oscillation of said screen being so selected that at least 99.95 percent by weight, based on the anhydrous weight, of sodium aluminosilicate particles recovered have a particle size of less than 100 μm, the said aqueous alkaline suspension of the crystallized sodium aluminosilicate having a molar ratio of 2.5–5 $Na_2O:1Al_2O_3:1.8$ to $2SiO_2:50–100H_2O$.

2. The process of claim 1, wherein said vibrating screen has a mesh size of 50 μm and the number of vibrations per minute and the amplitude of oscillation of said screen is so selected that at least 99.95 percent by weight, based on the anhydrous weight, of sodium aluminosilicate particles recovered have a particle size of less than 50 μm.

3. The process of claims 1 or 2, wherein said aqueous alkaline suspension of the crystallized sodium aluminosilicate subjected to said vibrating screen treatment has a mathematical total composition with a range of molar ratios of 2.5 to $5Na_2O:1Al_2O_3:1.8$ to $2SiO_2:50$ to $100H_2O$.

4. The process of claims 1 or 2, wherein said aqueous alkaline suspension of the crystallized sodium aluminosilicate is subjected to said vibrating screen treatment immediately after the crystallization.

5. The process of claim 3, wherein said aqueous alkaline suspension of the crystallized sodium aluminosilicate is subjected to said vibrating screen treatment immediately after the crystallization.

6. The process of claim 1, wherein more than 0.05 percent by weight on an anhydrous basis, of the particles in said aqueous suspension of crystallized sodium aluminosilicate have a particle size in excess of 100 μm.

7. The process of claim 2, wherein more than 0.05 percent by weight on an anhydrous basis, of the particles in said aqueous suspension of crystallized sodium aluminosilicate have a particle size in excess of 50 μm.

* * * * *